US012663209B1

(12) United States Patent (10) Patent No.: US 12,663,209 B1
Han et al. (45) Date of Patent: Jun. 23, 2026

(54) DEVICE FOR PRODUCING LIQUID FROM FLUE GAS WITH LOW ENERGY CONSUMPTION AND METHOD FOR USING SAME

(71) Applicant: HANGZHOU OXYGENPLANT GROUP CO., LTD., Hangzhou (CN)

(72) Inventors: Yisong Han, Hangzhou (CN); Fang Tan, Hangzhou (CN); Dahai Zheng, Hangzhou (CN); Lei Yao, Hangzhou (CN); Yunyun Jiang, Hangzhou (CN); Yi Gao, Hangzhou (CN); Liangying Li, Hangzhou (CN); XiaoQing Huang, Hangzhou (CN)

(73) Assignee: HANGZHOU OXYGENPLANT GROUP CO., LTD., Hangzhou (CN)

( * ) Notice: Subject to any disclaimer, the term of this patent is extended or adjusted under 35 U.S.C. 154(b) by 0 days.

(21) Appl. No.: 19/176,247

(22) Filed: Apr. 11, 2025

(30) Foreign Application Priority Data

Apr. 11, 2024 (CN) .......................... 202410431807.4

(51) Int. Cl.
F25J 1/00 (2006.01)
B01D 53/02 (2006.01)
(Continued)

(52) U.S. Cl.
CPC ............ F25J 1/0015 (2013.01); B01D 53/02 (2013.01); B01D 53/26 (2013.01); B01D 53/54 (2013.01);
(Continued)

(58) Field of Classification Search
CPC ...... F25J 1/0015; F25J 1/0027; F25J 2205/60; B01D 53/02; B01D 53/26; B01D 53/54;
(Continued)

(56) References Cited

U.S. PATENT DOCUMENTS 5,100,635 A * 3/1992 Krishnamurthy .......... F25J 3/08
423/247
5,233,837 A * 8/1993 Callahan ............... C01B 21/045
60/648
(Continued)

FOREIGN PATENT DOCUMENTS

CN 101198834 A * 6/2008 ................. F25J 3/04
CN 110498416 A 11/2019
(Continued)

OTHER PUBLICATIONS

Ding Jie et al., "Analysis of new system combining CO2 cryogenic capture and liquefaction with N2 /O2 separation" School of Energy and Environment, Southeast University, Engineering Technology Department, China Construction 3rd Engineering Bureau, Ciesc Journal, vol. 63, No. S2,Dec. 15, 2012.
(Continued)

*Primary Examiner* — Jianying C Atkisson
*Assistant Examiner* — Ibrahim A. Michael Adeniji
(74) *Attorney, Agent, or Firm* — Fideli Law PLLC; Qiang Li

(57) ABSTRACT

Disclosed are a device for producing liquid from flue gas with low energy consumption and a method for using the same. The device includes a $CO_2$ and $N_2$ low-temperature medium-pressure adsorption system, an energy utilization system, a low-temperature filtration gas low-temperature compression system, a $CO_2$ low-temperature purification system, and a nitrogen liquid device system; the systems are interconnected through pipelines and valves; the $CO_2$ and $N_2$ low-temperature medium-pressure adsorption system includes a flue gas cooler, a first gas-liquid separator, a compression system, a drying system, a gas expander system, and a low-temperature medium-pressure adsorption device; the energy utilization system includes an electric heater, a $CO_2$ compressor, a heat utilizer, and a second
(Continued)

cooler; the low-temperature filtration gas low-temperature compression system includes a low-temperature compressor and a $CO_2$ low-temperature purification system.

9 Claims, 2 Drawing Sheets

(51) Int. Cl.
B01D 53/26 (2006.01)
B01D 53/54 (2006.01)
B01D 53/62 (2006.01)
B01D 53/75 (2006.01)

(52) U.S. Cl.
CPC ............. B01D 53/62 (2013.01); B01D 53/75 (2013.01); F25J 1/0027 (2013.01); B01D 2257/102 (2013.01); B01D 2257/504 (2013.01); B01D 2258/0283 (2013.01); F25J 2205/60 (2013.01)

(58) Field of Classification Search
CPC .. B01D 53/62; B01D 53/75; B01D 2257/102; B01D 2257/504; B01D 2258/0283
See application file for complete search history.

(56) References Cited

U.S. PATENT DOCUMENTS

| | | | |
|---|---|---|---|
| 2008/0196587 A1 | 8/2008 | Ha | |
| 2009/0298957 A1* | 12/2009 | Gauthier | B01D 53/002 |
| | | | 518/700 |
| 2016/0256820 A1* | 9/2016 | Kulkarni | F25J 3/066 |

FOREIGN PATENT DOCUMENTS

| | | | |
|---|---|---|---|
| CN | 216845328 U | 6/2022 | |
| CN | 114857856 A | 8/2022 | |
| CN | 115069057 A | 9/2022 | |
| CN | 115790076 A | 3/2023 | |
| KR | 20110133782 A | 12/2011 | |
| WO | WO-2010103259 A2 * | 9/2010 | F25J 3/0655 |

OTHER PUBLICATIONS

The First Office Action for China Application No. 202410431807.4, May 17, 2024.
The Notice of Grant for China Application No. 202410431807.4, May 24, 2024.

* cited by examiner

Liquid Carbon Dioxide

DEVICE FOR PRODUCING LIQUID FROM FLUE GAS WITH LOW ENERGY CONSUMPTION AND METHOD FOR USING SAME

CROSS-REFERENCE TO RELATED APPLICATIONS

This application claims the benefit of priority of Chinese application number 202410431807.4, filed on Apr. 11, 2024. The entire contents of the above-mentioned applications are incorporated herein by reference.

FIELD OF THE INVENTION

The present invention belongs to the technical field of flue gas and relates to a device for producing liquid from flue gas with low energy consumption and a method for using the same.

BACKGROUND OF THE INVENTION

In the process of energy utilization, the main technologies for separating and recovering $CO_2$ include absorption technology, adsorption technology, membrane separation technology and low-temperature phase change separation technology, etc. The solution absorption is the most mature $CO_2$ capture method and has been widely used in many flue gases around the world, and this method can be used to separate CO2 from flue gas with low concentration at normal pressure, and can achieve a large processing capacity and high purity of $CO_2$. However, the regeneration of the solution after absorption requires plenty of heat; meanwhile, the preparation of the absorbent consumes resources, and the absorbent becomes ineffective after a period of use and needs to be constantly replenished. Chemical absorbents are toxic and corrosive, and have a great impact on the environment, and the cost of preparation and recovery is also high. The membrane separation method is to use the difference in the permeability of different gases made of polymeric materials to separate gases, and its driving force is the pressure difference. The technology is relatively limited in large-scale application. The pressure swing adsorption technology has many advantages because of easy regeneration of adsorbents, long service life of adsorbents, and simple equipment. However, for flue gas with low concentration of carbon dioxide, the cost and energy consumption of normal-temperature pressure swing adsorption technology are very high.

Chinese patent CN107899376A discloses a device and method for combined capture and recovery of carbon dioxide and nitrogen in flue gas. The invention belongs to membrane separation recovery, but the membrane has high requirements for gas source cleanliness, and has the disadvantages of short service life, low product purity, high membrane price; so it is not suitable for industrial large-scale production.

Chinese patent CN 210825439U discloses a system for synchronously recovering carbon dioxide and nitrogen from flue gas of coal-fired power plant boilers, including a flue gas pretreatment system, a PSA1 system, a PSA2 system, a carbon dioxide compression and purification system, a carbon dioxide distillation storage system, and a PSA nitrogen production system. The system can capture carbon dioxide and nitrogen to the greatest extent, but the product purity is only about 99.9%, and there are problems such as inflexible equipment operation and high energy consumption.

Chinese patent CN 216481836 U discloses a system for synchronously recovering nitrogen and carbon dioxide from boiler flue gas, including a flue gas pretreatment system, a carbon-nitrogen separation system, a carbon dioxide secondary purification system and a nitrogen concentration and purification system. The system can recover carbon dioxide and nitrogen to the greatest extent, but the carbon-nitrogen separation, carbon dioxide secondary purification system and nitrogen concentration and purification system for the system adopt normal-temperature pressure swing adsorption technology, with an adsorption pressure of up to 0.2-1.0 MPa, and the energy consumption is relatively high.

Chinese patent CN 115790076A discloses a device and method for recovering carbon dioxide and nitrogen from flue gas, including a pretreatment system, a $CO_2$ and $N_2$ separation system, an $N_2$ purification and liquefaction system and a $CO_2$ purification and liquefaction system. The system can utilize a large amount of cold energy released during LNG gasification to drive and liquefy carbon dioxide and nitrogen in flue gas, thereby greatly reducing the recovery energy consumption and cost. However, the system consumes a large amount of LNG and has high requirements on the source of LNG. In addition, the low-temperature adsorption is performed at normal pressure, the adsorption effect is poor, and the adsorption device is large in size and high in cost.

SUMMARY OF THE INVENTION

In view of the above background art, it is an object of the present invention is to provide a device for producing liquid from flue gas with low energy consumption and a method for using the same. By utilizing the cold energy released after the expansion of pressurized gas, combining with low-temperature medium-pressure adsorption technology, and coupling with the compression and expansion refrigeration technology of various compressors, liquid is produced from flue gas, achieving high economic and social value.

In order to achieve the above object, the present invention adopts the following technical solutions: A device for producing liquid from flue gas with low energy consumption includes a $CO_2$ and $N_2$ low-temperature medium-pressure adsorption system, an energy utilization system, a low-temperature filtration gas low-temperature compression system, a $CO_2$ low-temperature purification system, and a nitrogen liquid device system. The systems are interconnected through pipelines and valves. The $CO_2$ and $N_2$ low-temperature medium-pressure adsorption system includes a flue gas cooler, a first gas-liquid separator, a compression system, a drying system, a gas expander system, and a low-temperature medium-pressure adsorption device, which is used to cool, pressurize, dewater, and perform low-temperature adsorption separation of $CO_2$ and $N_2$ from the flue gas; the energy utilization system includes an electric heater, a $CO_2$ compressor, a heat utilizer, and a second cooler, which is used to pressurize, recover heat and cool desorbed gas obtained from the $CO_2$ and $N_2$ low-temperature medium-pressure adsorption system; the low-temperature filtration gas low-temperature compression system includes a low-temperature compressor, which is used for low-temperature pressurization of the low-temperature medium-pressure filtered gas obtained from the $CO_2$ and $N_2$ low-temperature medium-pressure adsorption system; the $CO_2$ low-temperature purification system is used to further purify and liquefy the low-temperature medium-pressure gas obtained from the energy utilization system, to obtain a liquid $CO_2$ product; and the nitrogen liquid device system is used to distill and liquefy medium-pressure gas discharged from the low-temperature compression system, to obtain a liquid nitrogen product.

Preferably, one end of a flue gas cooler in the $CO_2$ and $N_2$ low-temperature medium-pressure adsorption system is connected to a flue gas discharge port, while the other end is connected to a first gas-liquid separator. In the first gas-liquid separator, the liquid is discharged through a water outlet of the first gas-liquid separator, and the gas enters the compression system through a gas outlet of the first gas-liquid separator for compression, cooling, and dewatering; the compressed, cooled, and dewatered flue gas enters a drying system through a first pipeline to dehydrate and dry thoroughly, so that the flue gas discharged from the drying system has a water content of ppm level. The drying system is connected to a rear gas expander system, wherein the gas expander system consists of a first expander boosting end, a first cooler, and a gas expansion end. The flue gas with ppm-level water content sequentially enters the first expander boosting end, the first cooler, and the gas expansion end through the second pipeline. The gas expansion end then enters the low-temperature medium-pressure adsorption device through a rear third pipeline, where the $CO_2$ in the low-temperature medium-pressure flue gas is adsorbed and captured using the low-temperature medium-pressure adsorption principle. A crude $CO_2$ gas with a carbon purity of 85-90% is obtained at a desorption gas outlet of the low-temperature medium-pressure adsorption device, and a medium-pressure crude nitrogen gas with a $CO_2$ concentration of less than 1 ppm is obtained at the low-temperature medium-pressure filtered gas outlet of the low-temperature medium-pressure adsorption device. The nitrogen purity of the medium-pressure crude nitrogen gas is 87-93%, thus achieving the purpose of carbon nitrogen separation. The low-temperature medium-pressure filtered gas outlet is also connected to the low-temperature medium-pressure adsorption device through a fourth pipeline, so that a portion of the low-temperature filtered gas enters the low-temperature medium-pressure adsorption device through a fourth pipeline as cold-blowing regeneration gas, to cold-blow the adsorbent in the low-temperature medium-pressure adsorption device.

Preferably, the desorption gas outlet of the low-temperature medium-pressure adsorption device is connected to the $CO_2$ compressor in the energy utilization system, to compress and boost the crude $CO_2$ gas. The $CO_2$ compressor is sequentially connected to the heat utilizer, the second cooler, and the $CO_2$ low-temperature purification system. The second cooler further cools the pressurized crude $CO_2$ gas, such that the pressurized crude $CO_2$ gas exiting from the second cooler meets the temperature and pressure requirements of the $CO_2$ low-temperature purification system. The $CO_2$ low-temperature purification system is used to purify and refine the pressurized low-temperature $CO_2$, yielding industrial-grade or food-grade $CO_2$. The $CO_2$ low-temperature purification system is connected to the heat utilizer through a ninth pipeline, and the heat utilizer is connected to the fourth pipeline of the low-temperature medium-pressure adsorption device, to heat the low-temperature regeneration gas exiting from the $CO_2$ low-temperature purification system, which then enters the low-temperature medium-pressure adsorption device as heated regeneration gas.

Preferably, the low-temperature medium-pressure filtered gas outlet of the low-temperature medium-pressure adsorption device is sequentially connected to the low-temperature compressor and the nitrogen liquid device system in the low-temperature filtered gas compression system at the rear, to pressurize all or most of the low-temperature filtered gas, which then enters the nitrogen liquid device system. The nitrogen liquid device system is used to further refine and liquefy the pressurized low-temperature filtered gas to obtain the liquid nitrogen product. A tenth pipeline is arranged at the rear of the nitrogen liquid device system. The tenth pipeline is branched into two routes at the rear. One route is sequentially connected to the heat utilizer and the electric heater. The electric heater is connected to a sixth pipeline, and the sixth pipeline is connected to the drying system, to heat the waste gas regeneration gas from the nitrogen liquid device system to a required temperature before entering the drying system as the regeneration gas for heating. The other route of the tenth pipeline is directly connected to the sixth pipeline, to feed the waste gas regeneration gas from the nitrogen liquid device system to directly enter the drying system as cold blow gas for cold blowing.

Preferably, the $CO_2$ low-temperature purification system includes a third condenser, an evaporator, a liquefier, and a third distillation column, wherein the third condenser is mounted above the third distillation column, and the evaporator is mounted below the third distillation column. The liquefier is arranged separately outside the column. The second cooler is connected to the evaporator, and the evaporator is connected to the liquefier. The liquefier is connected to the third distillation column through an eighth pipeline. The third distillation column is connected to the third condenser, and the third condenser is connected to the third distillation column through a seventh pipeline to form a closed loop. A condensation liquid inlet channel and a condensation gas outlet channel are formed in the third condenser. A ninth pipeline is provided below the third distillation column and is connected to the heat utilizer. A fifth pipeline is provided at the bottom of the third distillation column for obtaining the liquid $CO_2$ product.

Preferably, the nitrogen liquid device system includes a circulating compression system, a high and low-temperature gas expander, a heat exchanger, a second gas-liquid separator, a distillation column system, and a subcooler. The circulating compression system consists of a first compressor and a second compressor. The high and low-temperature gas expander is equipped with a second expander boosting end, a first expansion end, and a second expansion end. The subcooler consists of a first subcooler, a second subcooler, and a third subcooler. The distillation column system consists of a first distillation column and a second distillation column, wherein a first condenser is mounted above the first distillation column, and a second condenser is mounted above the second distillation column. The low-temperature compressor is sequentially connected to the heat exchanger and the first distillation column. The first distillation column is provided with two branch pipelines, wherein the first branch of the first distillation column is sequentially connected to the first subcooler, the first condenser, the second distillation column, the second subcooler, and the second condenser. The second condenser is sequentially connected to the second subcooler, the first subcooler, and the heat exchanger through pipelines at the top. The heat exchanger is connected to the tenth pipeline for the regeneration of the drying system. The second branch pipeline of the first distillation column is directly connected to the first condenser and the heat exchanger separately. The first condenser is also provided with two branch pipelines, wherein the first branch pipeline of the first condenser is connected to the first distillation column, and the second branch pipeline of the first condenser is connected to the second gas-liquid separator. The second distillation column is provided with two branches, wherein the first branch of the second distillation column is connected to the second condenser, and the second branch of the second distillation column is connected to the heat exchanger. The second condenser is also provided with two branches, wherein the first branch of the second condenser is connected to the second distillation column, and the second branch of the second condenser is sequentially connected to the second gas-liquid separator and the third subcooler. One end of the third subcooler is connected to the liquid nitrogen product channel, and the other end is connected to the heat exchanger through a first throttle valve through the third subcooler. The second gas-liquid separator is connected to the heat exchanger, and the heat exchanger is sequentially connected to the first compressor and the second compressor. The second compressor is provided with two branches, wherein the first branch of the second compressor is sequentially connected to the high and low-temperature gas expander, the heat exchanger, and the second expansion end, and finally connected to the second gas-liquid separator for circulation through the second expansion end. The second branch of the second compressor is sequentially connected to the heat exchanger, the first expansion end, the heat exchanger, and finally connected to the first compressor for circulation through the heat exchanger. The heat exchanger is directly connected to the second gas-liquid separator, and a second throttle valve is provided on the connecting pipeline. Using the low-temperature distillation principle, the low-temperature nitrogen-containing gas obtained from the low-temperature compressor is further purified and liquefied, so as to obtain the liquid nitrogen product.

A method for using the device for producing liquid from flue gas with low energy consumption, including the following steps:

1) Flue Gas Pre-Treatment:

Performing compression, cooling, dewatering, and drying treatment on the flue gas, wherein the water content of the treated flue gas is less than 1 ppm;

2) Coarse Separation of $CO_2$ and $N_2$ Gases:

Introducing the gas from the step 1) into the gas expander system to obtain crude carbon dioxide gas with a carbon purity of 85-90%, and medium-pressure crude nitrogen gas with a carbon dioxide concentration of less than 1 ppm, wherein the nitrogen purity of the medium-pressure crude nitrogen gas is 87-93%;

3) Purification and Liquefaction to Obtain the Liquid $CO_2$ Product

Introducing the crude $CO_2$ gas with a carbon purity of 85-90% obtained from the step 2) into the $CO_2$ low-temperature purification system to obtain the liquid $CO_2$ product;

4) Purification and Liquefaction to Obtain the Liquid $N_2$ Product:

Introducing the medium-pressure crude nitrogen gas with a carbon dioxide concentration of less than 1 ppm obtained from the step 2) into the nitrogen liquid device system to obtain the liquid $N_2$ product. Preferably, the specific method for the step 1 includes: feeding the flue gas emitted at normal temperature and pressure into the flue gas cooler inlet, cooling the flue gas with a cooling medium, passing the cooled flue gas through the first gas-liquid separator to remove condensed water from the flue gas, and discharging the water through the water outlet of the first gas-liquid separator. The cooled flue gas subsequently flows through the gas outlet of the first gas-liquid separator into the compression system for compression, cooling, and dewatering. The pressurized medium-pressure flue gas is then conveyed through the first pipeline into the drying system for further dewatering and drying, such that the water content of the medium-pressure flue gas exiting from the drying system is less than 1 ppm.

Preferably, the specific method for the step 2 includes: pressurizing at the first expander boosting end of the gas expander system, cooling by the first cooler, expanding and cooling at the gas expansion end, feeding the expanded low-temperature medium-pressure gas into the low-temperature medium-pressure adsorption device, adsorbing and capturing $CO_2$ in the low-temperature medium-pressure flue gas according to the principle of low-temperature medium-pressure adsorption, to obtain the crude $CO_2$ with a carbon purity of 85-90% from the desorbed gas outlet of the low-temperature medium-pressure adsorption device, and obtain medium-pressure crude nitrogen with a $CO_2$ concentration of less than 1 ppm from the low-temperature medium-pressure filtration outlet of the low-temperature medium-pressure adsorption device. The nitrogen purity of the medium-pressure rough nitrogen gas is 87-93%, thereby achieving the separation of carbon and nitrogen. The low-temperature medium-pressure adsorption device switches between adsorption, desorption, regeneration, and cold blowing through valves and pipelines.

Preferably, the specific steps for obtaining liquid $CO_2$ in the step 3 include: feeding the desorbed gas from the desorption gas outlet of the low-temperature medium-pressure adsorption device into the $CO_2$ compressor in the energy utilization system, pressurizing the crude $CO_2$ gas, feeding the pressurized high-temperature high-pressure gas into the heat utilizer for heat exchange, adsorbing and utilizing the thermal energy of the pressurized coarse $CO_2$ gas, causing the gas to cool, then entering the second cooler, and further cooling the crude $CO_2$ gas, such that the pressurized crude $CO_2$ gas exiting from the second cooler meets the temperature and pressure requirements for the raw materials entering the $CO_2$ low-temperature purification system. The raw material temperature is 20-30° C., and the pressure is 2.0-2.5 MPaA. The gas then enters the $CO_2$ low-temperature purification system, to purify and refine the pressurized low-temperature $CO_2$ to obtain industrial-grade or food-grade $CO_2$. The low-temperature regeneration gas is extracted from the ninth pipeline of the $CO_2$ low-temperature purification system and can be reheated using the heat utilizer. The reheated regeneration gas then enters the low-temperature medium-pressure adsorption device, to heat and regenerate an adsorbent requiring regeneration, which eliminates the need for external heat energy during the regeneration process of the low-temperature medium-pressure adsorption device.

Preferably, the specific steps for obtaining liquid $N_2$ in the step 4 include: compressing all or most of the medium-pressure crude $N_2$ gas with a carbon dioxide concentration of less than 1 ppm from the low-temperature medium-pressure adsorption device by the low-temperature compressor in the low-temperature compression system, and directly entering the nitrogen liquid device system. When the adsorbent in the low-temperature medium-pressure adsorption device requires cold blowing for regeneration, a portion of the low-temperature filtered gas as cold blow regeneration gas is fed into the low-temperature medium-pressure adsorption device through the fourth pipeline, to cold-blow the adsorbent in the low-temperature medium-pressure adsorption device. The pressurized filtered gas then enters the nitrogen liquid device system for distillation and liquefaction. The waste gas regeneration gas from the nitrogen liquid device system is fed into the heat utilizer through the tenth pipeline to be heated, then enters the electric heater to be further heated to the required temperature, and enters a second inlet of the drying system as heated regeneration gas. Alternatively, the waste gas regeneration gas from the nitrogen liquid device system can be directly fed into the second inlet of the drying system through the tenth pipeline as cold blow gas.

Preferably, the specific method for purifying $CO_2$ gas in the $CO_2$ low-temperature purification system includes: feeding the crude $CO_2$ gas entering the $CO_2$ low-temperature purification system into the evaporator to evaporate the liquid from the bottom of the third distillation column, cooling, then entering the liquefier to be cooled to the saturation temperature, and entering the middle section of the third distillation column to undergo distillation. In the third condenser, the gas from the top of the third distillation column is condensed and returned as the reflux liquid at the top of the third distillation column to undergo distillation, and enters the third condenser through the condensation liquid inlet channel to be heated and vaporized to provide cooling energy. The liquid $CO_2$ product is obtained at the bottom of the third distillation column, and the liquid $CO_2$ product is output through the fifth pipeline at the bottom of the third distillation column, and is then extracted through the ninth pipeline from the upper part of the third distillation column to enter the heat exchanger for heating.

Preferably, the specific method for purifying the $N_2$ gas in the nitrogen liquid device system includes: overcooling the gas entering the nitrogen liquid device system to a saturated state in the heat exchanger and then entering the distillation column system. The distillation column system adopts a dual-column distillation process. A portion of the medium-pressure nitrogen gas from the top of the first distillation column is condensed in the first condenser, with the condensed liquid nitrogen portion returning to the top of the first distillation column. A portion enters the second gas-liquid separator. The liquid extracted from the bottom of the first distillation column is overcooled in a first subcooler and then enters the first condenser as a coolant. After heating, the liquid exits from the first condenser and enters the bottom of the second distillation column for further distillation. A portion of the low-pressure nitrogen gas exiting from the top of the second distillation column is condensed in the first condenser, with the liquid nitrogen portion returning to the top of the second distillation column, while a portion enters the second gas-liquid separator. Another portion of the medium-pressure nitrogen gas exiting from the top of the first distillation column is reheated in the heat exchanger and then enters the second compressor in the circulating compression system for compression. Another portion of the low-pressure nitrogen gas exiting from the top of the second distillation column is reheated in the heat exchanger and enters the first compressor and the second compressor sequentially in the circulating compression system for compression. The gas compressed by the second compressor is directed into the second expander boosting end of the high and low-temperature gas expander for pressurization, and after pressurization, enters the heat exchanger for cooling. A portion of the gas is extracted from the middle of the heat exchanger and enters the second expansion end for expansion. The expanded fluid then enters the second gas-liquid separator. The remaining gas is extracted from the bottom of the heat exchanger, throttled through the second throttle valve, and enters the second gas-liquid separator. Another portion of gas directly enters the heat exchanger and is extracted from the upper part of the heat exchanger into the first expansion end for expansion. The expanded gas enters the heat exchanger for reheating and then enters the first compressor and the second compressor sequentially for compression in the circulating compression system. After gas-liquid separation in the second gas-liquid separator, the liquid flows out from the liquid outlet of the second gas-liquid separator, and is overcooled by the third subcooler, and a portion of the liquid is throttled through the first throttle valve and enter the third subcooler to be reheated. The reheated fluid enters the heat exchanger to be further reheated and discharged as waste gas from the nitrogen liquid device system. The remaining liquid is extracted from the liquid nitrogen product channel as a high-purity liquid nitrogen product. The gas in the second gas-liquid separator exits through the gas outlet of the second gas-liquid separator, enters the heat exchanger to be reheated, and then enters the first compressor and the second compressor sequentially for compression in the circulating compression system. The liquid from the bottom of the second distillation column is overcooled in a second subcooler and then evaporated on the evaporation side of the second condenser. The evaporated gas is reheated successively through the second subcooler and the first subcooler. The reheated fluid enters the heat exchanger for further reheating and is discharged as waste gas from the nitrogen liquid device system.

Preferably, the adsorbent used in the low-temperature medium-pressure adsorption device is primarily composed of molecular sieves, silica gel, and activated carbon, and is configured with two units, which can be used individually or simultaneously. The drying system consists of two drying tanks connected in parallel, and the two drying tanks can be used individually or simultaneously.

According to the present invention, the device for producing liquid from flue gas with low energy consumption and a method for using the same can achieve the following beneficial effects:

1) The device and the method, based on the temperature and pressure requirements of each system, utilize the perfect coupling of compression and expansion, effectively matching the demands of different temperature zones and pressures.

2) The device and the method adopt the deep low-temperature medium-pressure adsorption to achieve carbon-nitrogen separation, efficiently producing high-concentration crude $CO_2$ gas and nitrogen gas. Additionally, the energy utilization system effectively utilizes the compression heat from the compressor, reducing both the heating power and the level of the electric heater, resulting in overall low energy consumption.

3) In the present invention, by taking advantage of low-temperature medium-pressure adsorption separation characteristic, the $CO_2$ and $N_2$ are separated in an efficient and cost-saving manner. Additionally, $CO_2$ and $N_2$ can be purified and liquefied using a low-temperature distillation method, thus high-purity liquid $CO_2$ and high-purity liquid nitrogen are obtained efficiently.

DETAILED DESCRIPTION

Figure 1:
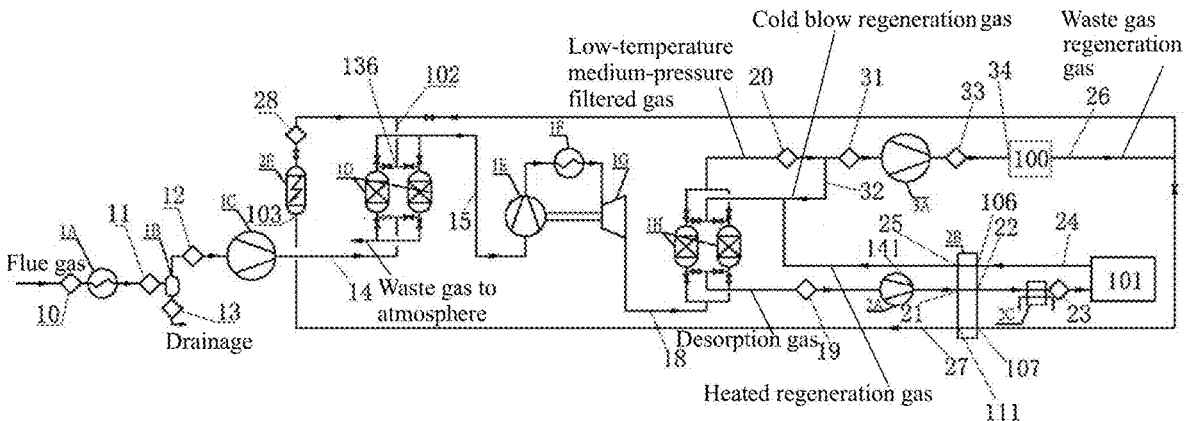
FIG. 1 is a process flow diagram of the present invention.

The present invention will be described in detail below with reference to the accompanying drawings. A device for producing liquid from flue gas with low energy consumption includes a $CO_2$ and $N_2$ low-temperature medium-pressure adsorption system, an energy utilization system, a low-temperature filtration gas low-temperature compression system, a $CO_2$ low-temperature purification system 101, and a nitrogen liquid device system 100; the systems are interconnected through pipelines and valves, wherein the $CO_2$ and $N_2$ low-temperature medium-pressure adsorption system includes a flue gas cooler 1A, a first gas-liquid separator 1, a compression system 1C, a drying system 1D, a gas expander system, and a low-temperature medium-pressure adsorption device 1H, which is used to cool, pressurize, dewater, and perform low-temperature adsorption separation of $CO_2$ and $N_2$ from the flue gas; the energy utilization system includes an electric heater 2E, a $CO_2$ compressor 2A, a heat utilizer 2B, and a second cooler 2C, which is used to pressurize, recover heat and cool desorbed gas obtained from the $CO_2$ and $N_2$ low-temperature medium-pressure adsorption system; the low-temperature filtration gas low-temperature compression system includes a low-temperature compressor 3A, which is used for low-temperature pressurization of the low-temperature medium-pressure filtered gas obtained from the $CO_2$ and $N_2$ low-temperature medium-pressure adsorption system, the $CO_2$ low-temperature purification system 101 is used to further purify and liquefy the low-temperature medium-pressure gas obtained from the energy utilization system, to obtain a liquid $CO_2$ product; and the nitrogen liquid device system 100 is used to distill and liquefy medium-pressure gas discharged from the low-temperature compression system, to obtain a liquid nitrogen product.

A flue gas cooler inlet 10 in the $CO_2$ and $N_2$ low-temperature medium-pressure adsorption system is connected to a flue gas discharge port, and a flue gas cooler outlet 11 is connected to a first gas-liquid separator 1B, wherein the liquid is discharged through a water outlet 13 of the first gas-liquid separator, and the gas enters the compression system 1C through a gas outlet 12 of the first gas-liquid separator for compression, cooling, and dewatering, the compressed, cooled, and dewatered flue gas enters a drying system 1D through a first pipeline 14 to dehydrate and dry thoroughly, so that the flue gas emitted from the drying system 1D has a water content of ppm level, the drying system 1D is connected to a rear gas expander system, wherein the gas expander system consists of a first expander boosting end 1E, a first cooler 1F, and a gas expansion end 1G. The flue gas with ppm-level water content sequentially enters the first expander boosting end 1E, the first cooler 1F, and the gas expansion end 1G through the second pipeline 15, the gas expansion end 1G then enters the low-temperature medium-pressure adsorption device 1H through a rear third pipeline 18, where the $CO_2$ in the low-temperature medium-pressure flue gas is adsorbed and captured using the low-temperature medium-pressure adsorption principle, a crude $CO_2$ gas with a carbon purity of 85-90% is obtained at a desorption gas outlet 19 of the low-temperature medium-pressure adsorption device, and a medium-pressure crude nitrogen gas with a $CO_2$ concentration of less than 1 ppm is obtained at the low-temperature medium-pressure filtered gas outlet 20 of the low-temperature medium-pressure adsorption device; the nitrogen purity of the medium-pressure crude nitrogen gas is 87-93%, thus achieving the purpose of carbon nitrogen separation. The low-temperature medium-pressure filtered gas outlet 20 is also connected to the low-temperature medium-pressure adsorption device 1H through a fourth pipeline 32, so that a portion of the low-temperature filtered gas enters the low-temperature medium-pressure adsorption device 1H through the fourth pipeline 32 as cold-blowing regeneration gas, to cold-blow the adsorbent in the low-temperature medium-pressure adsorption device 1H.

The desorption gas outlet 19 of the low-temperature medium-pressure adsorption device is connected to the $CO_2$ compressor 2A in the energy utilization system, to compress and boost the crude $CO_2$ gas. The CO2 compressor outlet 141 is connected to the first inlet 21 of the heat utilizer to absorb and utilize the heat energy of the pressurized crude CO2 gas and cool. The first outlet 22 of the heat utilizer is connected to the second cooler 2C, and the cooled and pressurized crude CO2 gas is further cooled in the second cooler 2C, so that the pressurized crude CO2 gas exiting from the second cooler 2C can meet the raw material temperature and pressure requirements of the CO2 low-temperature purification system 101. The second cooler outlet 23 is connected to the CO2 low-temperature purification system 101, and the CO2 low-temperature purification system 101 is used to purify the pressurized low-temperature CO2 to obtain industrial-grade or food-grade carbon dioxide. The CO2 low-temperature purification system 101 is connected to the second inlet 106 of the heat utilizer through the ninth pipeline 24. The second outlet 25 of the heat utilizer is connected to the fourth pipeline 32 on the low-temperature medium-pressure adsorption device 1H, which is used to heat the low-temperature regeneration gas coming out of the CO2 low-temperature purification system 101 and then enter the low-temperature medium-pressure adsorption device 1H as heated regeneration gas.

The low-temperature medium-pressure filtered gas outlet 20 of the low-temperature medium-pressure adsorption device 1H is connected to the low-temperature compressor inlet 31 of the low-temperature filtration gas low-temperature compression system, and the low-temperature compressor outlet 33 is connected to the nitrogen liquid device system inlet 34, such that all or most of the low-temperature filtered gas from the low-temperature medium-pressure adsorption device 1H enters the nitrogen liquid device system 100 after being pressurized by the low-temperature compression system. The nitrogen liquid device system 100 is used to further rectify and liquefy the pressurized low-temperature filtered gas by using the low-temperature rectification principle to obtain a liquid nitrogen product. The nitrogen liquid device system 100 is connected to the third inlet 107 of the heat utilizer through one end of the tenth pipeline 26, and the third outlet 111 of the heat utilizer is connected to the electric heater inlet 103 through the fifth pipeline 27. The electric heater outlet 28 is connected to the drying system 1D through the sixth pipeline 102, and is used to heat the waste gas regeneration gas exiting from the nitrogen liquid device system 100 to the required temperature, and the heated gas enters the drying system 1D as the regeneration gas for heating. The other end of the nitrogen liquid device system 100 can also be directly connected to the sixth pipeline 102 of the drying system 1D through the tenth pipeline 26, to feed the waste gas regeneration gas from the nitrogen liquid device system 100 to directly enter the drying system 1D as cold blow gas for cold blowing.

The CO2 low-temperature purification system 101 includes a third condenser 4F, an evaporator 4D, a liquefier 4E, and a third distillation column 4G, wherein the third condenser 4F, the third distillation column 4G, and the evaporator 4D are uniformly arranged in the column from top to bottom, and the liquefier 4E is arranged outside the column. The cooler outlet 23 is connected to the evaporator inlet end 104, the evaporator outlet end 45 is connected to the liquefier 4E, and the liquefier 4E is connected to the first inlet 108 of the third distillation column through an eighth pipeline 46; the first outlet 42 of the third distillation column is connected to the third condenser inlet 109, and the third condenser outlet is connected to the second inlet 43 of the third distillation column through a seventh pipeline 110; a condensation liquid inlet channel 48 and a condensation gas outlet channel 49 are formed in the third condenser 4F; a ninth pipeline 24 is provided at the bottom of the third distillation column 4G and is connected to the second inlet 106 of the heat utilizer; a fifth pipeline 47 is provided at the bottom of the third distillation column 4G for obtaining liquid CO2 product.

The nitrogen liquid device system 100 includes a circulating compression system, a high and low-temperature gas expander, a heat exchanger 5A, a second gas-liquid separator 5H, a distillation column system, and a subcooler, the circulating compression system consists of a first compressor 5K1 and a second compressor 5K2, the high and low-temperature gas expander is equipped with a second expander boosting end 5P, a first expansion end 5T, and a second expansion end 5U, the subcooler consists of a first subcooler 5D, a second subcooler 5F, and a third subcooler 5J. The distillation column system includes a first distillation column 5B, a first condenser 5C, a second distillation column 5E and a second condenser 5G. The outlet 33 of the low-temperature compressor is connected to the first channel inlet 34 of the heat exchanger, the first channel outlet 112 of the heat exchanger is connected to the first inlet 60 of the first distillation column, the first outlet 61 of the first distillation column is connected to the first channel inlet 113 of the first subcooler, the first channel outlet 114 of the first subcooler is connected to the first inlet 62 of the first condenser, the first outlet 64 of the first condenser is connected to the first inlet 115 of the second distillation column, the second outlet 50 of the first distillation column is connected to the second inlet 116 of the first condenser on one path and to the third channel inlet 117 of the heat exchanger on the other path; the second outlet 63 of the first condenser is connected to the second inlet 118 of the first distillation column on one path and to the first inlet 119 of the second gas-liquid separator on the other path; the first outlet 65 of the second distillation column is connected to the first channel inlet 120 of the second subcooler, the first channel outlet 121 of the second subcooler is connected to the first inlet 66 of the second condenser, the first outlet 70 of the second condenser is connected to the second channel inlet 122 of the second subcooler, the second channel outlet 71 of the second subcooler is connected to the second channel inlet 123 of the first subcooler, the second channel outlet 72 of the first subcooler is connected to the second channel inlet 84 of the heat exchanger, the second channel outlet 124 of the heat exchanger is connected to the tenth pipeline 26 for regeneration of the drying system 1D, the second outlet 68 of the second distillation column is connected to the second inlet 160 of the second condenser on one path, and is connected to the fourth channel inlet 67 of the heat exchanger on the other path, the second outlet 69 of the second condenser is connected to the second inlet 125 of the second distillation column on one path, and is connected to the second inlet 126 of the second gas-liquid separator on the other path, the liquid outlet 80 of the second gas-liquid separator is connected to the first channel inlet 138 of the third subcooler, the first channel outlet 81 of the third subcooler is connected to the inlet 137 of the first throttle valve V4, the outlet 82 of the first throttle valve V4 is connected to the second channel inlet 127 of the third subcooler, the second channel outlet 83 of the third subcooler is connected to the second channel inlet 84 of the heat exchanger, the first channel outlet 81 of the third subcooler is connected to the liquid nitrogen product channel 85. The liquid nitrogen at the bottom of the second gas-liquid separator 5H is supercooled by the third subcooler 5J and flows out from the liquid nitrogen product channel 85, the gas outlet 78 of the second gas-liquid separator is connected to the fifth channel inlet 128 of the heat exchanger, the fourth channel outlet 74 of the heat exchanger and the fifth channel outlet 79 of the heat exchanger are connected to the first compressor inlet 52 of the circulating compression system, the third channel outlet 51 of the heat exchanger and the first compressor outlet 53 are connected to the second compressor inlet 129 of the circulating compression system, the second compressor outlet 54 is connected to the high and low-temperature gas expander inlet 55 on one path and to the eighth channel inlet 130 of the heat exchanger on the other path; the eighth channel outlet 131 of the heat exchanger is connected to the first expansion end inlet 58 of the high and low-temperature gas expander, the first expansion end outlet 59 is connected to the seventh channel inlet 132 of the heat exchanger, the seventh channel outlet 133 of the heat exchanger is connected to the first compressor inlet 52, the boosting end outlet 56 of the high and low-temperature gas expander is connected to the sixth channel inlet 134 of the heat exchanger, the sixth channel outlet 1 of the heat exchanger is connected to the second expansion end inlet 75 of the high and low-temperature gas expander, the second expansion end outlet 76 is connected to the fourth inlet 139 of the second gas-liquid separator, the sixth channel outlet 2 of the heat exchanger is connected to the inlet 77 of the second throttle valve V3, the outlet 140 of the second throttle valve V3 is connected to the third inlet 135 of the second gas-liquid separator, and the low-temperature nitrogen-containing gas obtained from the low-temperature compressor is further purified and liquefied by utilizing the principle of low-temperature distillation to obtain the liquid nitrogen product.

A method for using the device for producing liquid from flue gas with low energy consumption includes the following steps:

1 Flue Gas Pre-Treatment:

Performing compression, cooling, dewatering, and drying treatment on the flue gas, wherein the water content of the treated flue gas is less than 1 ppm;

2 Coarse Separation of $CO_2$ and $N_2$ Gases:

Introducing the gas from the step 1 into the gas expander system to obtain crude carbon dioxide gas with a carbon purity of 85-90%, and medium-pressure crude nitrogen gas with a carbon dioxide concentration of less than 1 ppm, wherein the nitrogen purity of the medium-pressure crude nitrogen gas is 87-93%;

3 Purification and Liquefaction to Obtain the Liquid $CO_2$ Product

Introducing the crude $CO_2$ gas with a carbon purity of 85-90% obtained from the step 2 into the $CO_2$ low-temperature purification system 101 to obtain the liquid $CO_2$ product;

4 Purification and Liquefaction to Obtain the Liquid $N_2$ Product:

Introducing the medium-pressure crude nitrogen gas with a carbon dioxide concentration of less than 1 ppm obtained from the step 2 into the nitrogen liquid device system 100 to obtain the liquid $N_2$ product.

The specific method for the step 1 includes: feeding the flue gas emitted at normal temperature and pressure into a flue gas cooler inlet 10, cooling the flue gas with a cooling medium, passing the cooled flue gas through the first gas-liquid separator 1B to remove condensed water from the flue gas, and discharging the water through the water outlet 13 of the first gas-liquid separator; the cooled flue gas subsequently flows through a gas outlet 12 of the first gas-liquid separator into the compression system 1C for compression, cooling, and dewatering, the pressurized medium-pressure flue gas is then conveyed through the first pipeline 14 into the drying system 1D for further dewatering and drying, such that the water content of the medium-pressure flue gas exiting from the drying system 1D is less than 1 ppm.

The specific method for the step 2 includes: pressurizing at the first expander boosting end 1E of the gas expander system, cooling by the first cooler 1F, expanding and cooling at the gas expansion end 1G, feeding the expanded low-temperature medium-pressure gas into the low-temperature medium-pressure adsorption device 1H, adsorbing and capturing $CO_2$ in the low-temperature medium-pressure flue gas according to the principle of low-temperature medium-pressure adsorption, to obtain the crude $CO_2$ with a carbon purity of 85-90% from the desorbed gas outlet 19 of the low-temperature medium-pressure adsorption device, and obtain medium-pressure crude nitrogen with a $CO_2$ concentration of less than 1 ppm from the low-temperature medium-pressure filtered gas outlet 20 of the low-temperature medium-pressure adsorption device; the nitrogen purity of the medium-pressure rough nitrogen gas is 87-93%, thereby achieving the separation of carbon and nitrogen, the low-temperature medium-pressure adsorption device 1H switches between adsorption, desorption, regeneration, and cold blowing through valves and pipelines.

The specific steps for obtaining liquid $CO_2$ in the step 3 include: feeding the desorbed gas from the desorption gas outlet 19 of the low-temperature medium-pressure adsorption device into the $CO_2$ compressor 2A in the energy utilization system, pressurizing the crude $CO_2$ gas, feeding the pressurized high-temperature high-pressure gas into the heat utilizer 2B for heat exchange, adsorbing and utilizing the thermal energy of the pressurized coarse $CO_2$ gas, causing the gas to cool, then entering the second cooler 2C, and further cooling the crude $CO_2$ gas, such that the pressurized crude $CO_2$ gas exiting from the second cooler 2C meets the temperature and pressure requirements for the raw materials entering the $CO_2$ low-temperature purification system 101, the raw material temperature is 20-30° C., and the pressure is 2.0-2.5 MPaA, the gas then enters the $CO_2$ low-temperature purification system 101, to purify and refine the pressurized low-temperature $CO_2$ to obtain industrial-grade or food-grade $CO_2$, the low-temperature regeneration gas is extracted from the ninth pipeline 24 of the $CO_2$ low-temperature purification system 101 and can be reheated using the heat utilizer 2B, the reheated regeneration gas then enters the low-temperature medium-pressure adsorption device 1H, to heat and regenerate an adsorbent requiring regeneration, which eliminates the need for external heat energy during the regeneration process of the low-temperature medium-pressure adsorption device 1H.

The specific steps for obtaining liquid $N_2$ in the step 4 include: compressing all or most of the medium-pressure crude $N_2$ gas with a carbon dioxide concentration of less than 1 ppm from the low-temperature medium-pressure adsorption device 1H by the low-temperature compressor 3A in the low-temperature filtration gas low-temperature compression system, and directly entering the nitrogen liquid device system 100, when the adsorbent in the low-temperature medium-pressure adsorption device 1H requires cold blowing for regeneration, a portion of the low-temperature filtered gas as cold blow regeneration gas is fed into the low-temperature medium-pressure adsorption device 1H through the fourth pipeline 32, to cold-blow the adsorbent in the low-temperature medium-pressure adsorption device 1H, the pressurized filtered gas then enters the nitrogen liquid device system 100 for distillation and liquefaction, the waste gas regeneration gas from the nitrogen liquid device system 100 is fed into the heat utilizer 2B through the tenth pipeline 26 to be heated, then enters the electric heater 2E to be further heated to the required temperature, and enters the drying system inlet 136 as heated regeneration gas, the waste gas regeneration gas from the nitrogen liquid device system 100 can also be directly fed into the drying system inlet 136 through the tenth pipeline 26 as cold blow gas.

The specific method for purifying $CO_2$ gas in the $CO_2$ low-temperature purification system 101 includes: feeding the crude $CO_2$ gas entering the $CO_2$ low-temperature purification system 101 into the evaporator 4D to evaporate the liquid from the bottom of the third distillation column 4G, cooling, then entering the liquefier 4E to be cooled to the saturation temperature, and entering the middle section of the third distillation column 4G to undergo distillation, in the third condenser 4F, the gas from the top of the third distillation column 4G is condensed and returned as the reflux liquid at the top of the third distillation column 4G to undergo distillation, and enters the third condenser 4F through the condensation liquid inlet channel 48 to be heated and vaporized to provide cooling energy, the liquid $CO_2$ product is obtained at the bottom of the third distillation column 4G, and the liquid $CO_2$ product is output through the fifth pipeline 47 at the bottom of the third distillation column 4G, and is then extracted through the ninth pipeline 24 from the upper part of the third distillation column 4G to enter the heat utilizer 2B for heating.

The specific method for purifying the $N_2$ gas in the nitrogen liquid device system 100 comprises: overcooling the gas entering the nitrogen liquid device system 100 to a saturated state in the heat exchanger 5A and then entering the distillation column system, the distillation column system adopts a dual-column distillation process, a portion of the medium-pressure nitrogen gas from the top of the first distillation column 5B is condensed in the first condenser 5C, with the condensed liquid nitrogen portion returning to the top of the first distillation column 5B, and a portion enters the second gas-liquid separator 5H, the liquid extracted from the bottom of the first distillation column 5B is overcooled in a first subcooler 5D and then enters the first condenser 5C as a coolant, after heating, the liquid exits from the first condenser 5C and enters the bottom of the second distillation column 5E for further distillation, a portion of the low-pressure nitrogen gas exiting from the top of the second distillation column 5E is condensed in the second condenser 5G, with the liquid nitrogen portion returning to the top of the second distillation column 5E, while a portion enters the second gas-liquid separator 5H, another portion of the medium-pressure nitrogen gas exiting from the top of the first distillation column 5B is reheated in the heat exchanger 5A and then enters the second compressor 5K2 in the circulating compression system for compression, another portion of the low-pressure nitrogen gas exiting from the top of the second distillation column 5E is reheated in the heat exchanger 5A and enters the first compressor 5K1 and the second compressor 5K2 sequentially in the circulating compression system for compression, the gas compressed by the second compressor 5K2 is directed into the second expander boosting end 5P of the high and low-temperature gas expander for pressurization, and after pressurization, enters the heat exchanger 5A for cooling, a portion of the gas is extracted from the middle of the heat exchanger 5A and enters the second expansion end 5U for expansion, the expanded fluid then enters the second gas-liquid separator 5H, the remaining gas is extracted from the bottom of the heat exchanger 5A, throttled through the second throttle valve V3, and enters the second gas-liquid separator 5H; another portion of gas directly enters the heat exchanger 5A and is extracted from the upper part of the heat exchanger 5A into the first expansion end 5T for expansion, the expanded gas enters the heat exchanger 5A for reheating and then enters the first compressor 5K1 and the second compressor 5K2 sequentially for compression in the circulating compression system, after gas-liquid separation in the second gas-liquid separator 5H, the liquid flows out from the liquid outlet 80 of the second gas-liquid separator, and is overcooled by the third subcooler 5J, and a portion of the liquid is throttled through the first throttle valve V4 and enter the third subcooler 5J to be reheated, the reheated fluid enters the heat exchanger 5A to be further reheated and discharged as waste gas from the nitrogen liquid device system 100; the remaining liquid is extracted from the liquid nitrogen product channel 85 as a high-purity liquid nitrogen product, the gas in the second gas-liquid separator 5H exits through the gas outlet 78 of the second gas-liquid separator 5H, enters the heat exchanger 5A to be reheated, and then enters the first compressor 5K1 and the second compressor 5K2 sequentially for compression in the circulating compression system, the liquid from the bottom of the second distillation column 5E is overcooled in a second subcooler 5F and then evaporated on the evaporation side of the second condenser 5G, the evaporated gas is reheated successively through the second subcooler 5F and the first subcooler 5D, the reheated fluid enters the heat exchanger 5A for further reheating and is discharged as waste gas from the nitrogen liquid device system 100.

The adsorbent used in the low-temperature medium-pressure adsorption device 1H is primarily a molecular sieve, silica gel, and activated carbon, and is configured with two units, which can be used individually or simultaneously, the drying system 1D consists of two drying tanks connected in parallel, and the two drying tanks can be used individually or simultaneously.

In the present invention, the outlet pressure of the compression system 1C is coupled with the gas expander system, the low-temperature compressor 3A and the CO2 compressor 2A. The outlet pressure of the compression system 1C should consider the energy consumption of the compression system itself, the low-temperature compressor 3A and the CO2 compressor 2A, the refrigeration capacity of the gas expander system, the expansion outlet pressure of the gas expansion end 1G to ensure efficient adsorption for the low-temperature medium-pressure adsorption device 1H; in addition, the expansion outlet temperature of the gas expansion end 1G should be considered to ensure that the gas expanded through the gas expansion end 1G is not solidified but can be effectively adsorbed, and the investment cost, drying effect and adsorption effect of the drying system 1D and the low-temperature medium-pressure adsorption device 1H. Furthermore, the investment cost, drying effect and adsorption effect of the drying system 1D and the low-temperature medium-pressure adsorption device 1H should also be considered.

In the present invention, an energy utilization system is used to effectively utilize the compression heat of the CO2 compressor 2A, so that the heated regeneration gas required by the low-temperature medium-pressure adsorption device 1H and the drying system 1D can be obtained by reheating the heat utilizer 2B, which eliminates the need for external heat energy during the regeneration process of the low-temperature medium-pressure adsorption device 1H and reduces the heating power of the electric heater 2E, thereby greatly saving the overall energy consumption.

Example 1

As shown in FIG. 1, the flue gas at normal temperature and pressure that met the ultra-low emission standard, with a temperature of about 50° C., a pressure of about 0.1 MIPaA, and molar components of about 12% $CO_2$, 73% $N_2$, 8% $H_2O$, 6% $O_2$, 0.984% Ar, 100 ppm CO, 50 ppmNO$_2$, 10 ppm SO$_2$, entered the flue gas cooler inlet 10, and cooled to about 6° C. by the cooling medium; the cooled flue gas passed through the gas-liquid separator 1B to remove condensed water in the flue gas, and the water was discharged through the water outlet 13 of the gas-liquid separator; the cooled flue gas passed through the gas outlet 12 of the gas-liquid separator to enter the compression system 1C for compression, cooling, and dewatering. The saturated flue gas with a pressure of about 0.8 MPaA and a temperature of about 6° C. entered the first pipeline 14 of the drying system 1D for further dewatering and drying, so that the water content of the flue gas exiting from the drying system 1D was not higher than 1 ppm; subsequently, the flue gas entered the first expander boosting end 1 of the gas expander system to pressurize to about 1.6 MPaA, and then cooled to about 6° C. by the first cooler 1F before entering the gas expansion end 1G for expansion and refrigeration. The expanded low-temperature medium-pressure gas with a pressure of about 0.41 MPaA and a temperature of about −80° C. entered the low-temperature medium-pressure adsorption device 1H, and the CO2 in the low-temperature medium-pressure flue gas was adsorbed and captured by the low-temperature medium-pressure adsorption principle. A low-temperature medium-pressure nitrogen-containing gas with a carbon dioxide content of less than 1 ppm and a pressure of about 0.4 MPaA and high nitrogen purity was obtained in the low-temperature medium-pressure filtered gas outlet 20 of the low-temperature medium-pressure adsorption device, thereby achieving the purpose of carbon and nitrogen separation. The low-temperature medium-pressure adsorption device 1H switched between adsorption, desorption, regeneration, and cold blowing through valves and pipelines. The adsorbents used in the low-temperature medium-pressure adsorption device 1H were mainly molecular sieves, silica gel and activated carbon. When the low-temperature medium-pressure adsorption device 1H was desorbed, crude carbon dioxide gas with a carbon purity of 85-90% was obtained at the desorption gas outlet 19 of the low-temperature medium-pressure adsorption device.

The desorbed gas (temperature of about 10° C., pressure of about 0.11 MPaA, molar components of about 92% $CO_2$, 8% $N_2$, 50 ppmNO$_2$, 10 ppm SO$_2$) from the desorbed gas outlet 19 of the low-temperature medium-pressure adsorption device entered the CO2 compressor 2A of the energy utilization system and was pressurized to about 2.3 MIPaA, and the outlet temperature was about 100° C. Then, the gas entered the heat utilizer 2B for heat exchange, and the heat energy of the pressurized crude CO2 gas was adsorbed and utilized, and the gas was cooled, then enters the second cooler 2C, and the cooled and pressurized crude CO2 gas was further cooled, so that the pressurized crude CO2 gas exiting from the second cooler 2C was cooled to about 25°

C., meeting the raw material temperature and pressure requirements of the CO2 low-temperature purification system. Then, the gas entered the $CO_2$ low-temperature purification system to purify and refine the pressurized low-temperature $CO_2$ to obtain industrial-grade or food-grade $CO_2$. When the low-temperature medium-pressure adsorption device 1H was heated, the low-temperature regeneration gas (with a temperature of about −12.7° C., a pressure of about 2.3 MPaA, and molar components of about 98.5% $CO_2$, 1.5% $N_2$, 20 ppm CO, 2 ppm$NO_2$, 1 ppm $SO_2$) was extracted from the ninth pipeline 24 of the CO2 low-temperature purification system, and could be reheated using the heat utilizer 2B to about 90° C. The reheated regeneration gas then entered the low-temperature medium-pressure adsorption device 1H, to heat and regenerate an adsorbent requiring regeneration, which eliminates the need for external heat energy during the regeneration process of the low-temperature medium-pressure adsorption device 1H.

All or most of medium-pressure crude $N_2$ gas (a temperature of about −87° C., a pressure of about 0.4 MPaA, molar components of about 92% $N_2$, 7.5% $O_2$, 1.4% Ar, 120 ppm CO and 1 ppm $CO_2$) with a carbon dioxide concentration of less than 1 ppm from the low-temperature medium-pressure adsorption device 1H was compressed by the low-temperature compressor 3A in the low-temperature filtration gas low-temperature compression system to about 0.9 MPaA and about −10° C., then directly entered the nitrogen liquid device system; when the adsorbent in the low-temperature medium-pressure adsorption device 1H required cold blowing for regeneration, a portion of the low-temperature filtered gas as cold blow regeneration gas was fed into the low-temperature medium-pressure adsorption device 1H through the fourth pipeline 32, to cold-blow the adsorbent in the low-temperature medium-pressure adsorption device 1H, the pressurized filtered gas then entered the nitrogen liquid device system for distillation and liquefaction. When the drying system 1D required heating, the waste gas regeneration gas from the nitrogen liquid device system was fed into the heat utilizer 2B through the tenth pipeline 26 to be heated to about 90° C., then entered the electric heater 2E to be further heated to about 170° C., and entered the drying system inlet 136 as heated regeneration gas; when the drying system 1D required clod blowing, the waste gas regeneration gas with normal pressure from the nitrogen liquid device system could also be directly fed into the drying system inlet 136 through the tenth pipeline 26 as cold blow gas.

Figure 2:
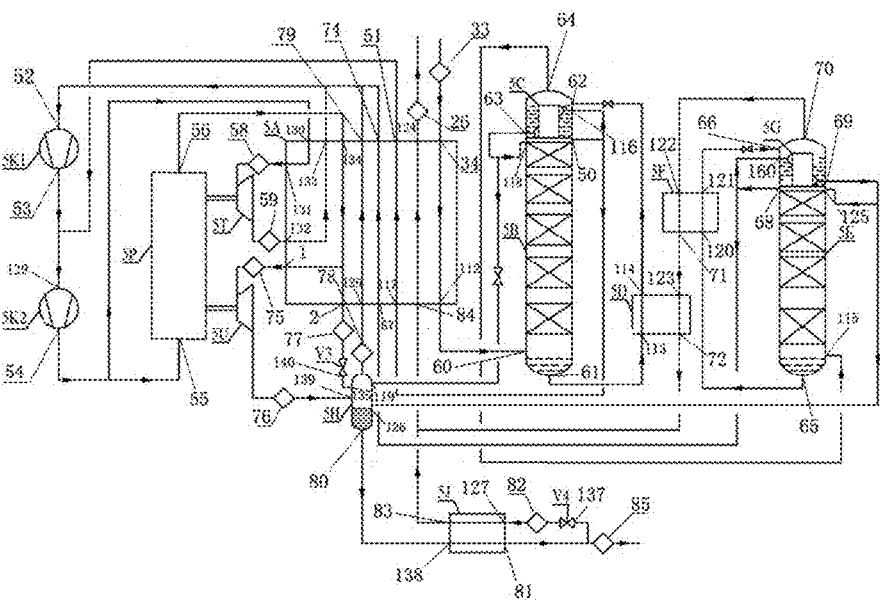
FIG. 2 is a structural schematic diagram of a nitrogen liquid device system.

As shown in FIG. 2, the gas (a pressure of about 0.9 MIPaA and a temperature of about −10° C.) entering the nitrogen liquid device system was overcooled to a saturated state in the heat exchanger 5A and then entered the distillation column system for distillation. A portion of the medium-pressure nitrogen gas from the top of the distillation column 5B was condensed in the first condenser 5C, with the condensed liquid nitrogen portion returning to the top of the distillation column 5B, and a portion entered the gas-liquid separator 5H, the liquid extracted from the bottom of the distillation column 5B was overcooled in a first subcooler 5D and then entered the first condenser 5C as a coolant. After heating, the liquid exited from the first condenser 5C and entered the bottom of the second distillation column 5E for further distillation, a portion of the low-pressure nitrogen gas exiting from the top of the second distillation column 5E was condensed in the second condenser 5G, with the liquid nitrogen portion returning to the top of the second distillation column 5E, while a portion entered the gas-liquid separator 5H, another portion of the medium-pressure nitrogen gas exiting from the top of the distillation column 5B was reheated in the heat exchanger 5A and then entered the second compressor 5K2 in the circulating compression system for compression to about 2.5 MIPaA. Another portion of the low-pressure nitrogen gas exiting from the top of the second distillation column 5E was reheated in the heat exchanger 5A and entered the first compressor 5K1 and the second compressor 5K2 sequentially in the circulating compression system for compression to about 2.5 MIPaA, the gas compressed by the second compressor 5K2 was directed into the second expander boosting end 5P of the high and low-temperature gas expander for pressurization, and after pressurization, entered the heat exchanger 5A for cooling, a portion of the gas was extracted from the middle of the heat exchanger 5A and entered the second expansion end 5U for expansion to about 0.39 MPaA, the expanded fluid then entered the gas-liquid separator 5H, the remaining gas was extracted from the bottom of the heat exchanger 5A, throttled through the second throttle valve V3, and entered the second gas-liquid separator 5H; another portion of gas directly entered the heat exchanger 5A and was extracted from the upper part of the heat exchanger 5A into the first expansion end 5T for expansion, the expanded gas entered the heat exchanger 5A for reheating and then entered the first compressor 5K1 and the second compressor 5K2 sequentially for compression to about 2.5 MPaA in the circulating compression system, after gas-liquid separation in the gas-liquid separator 5H, the liquid flowed out from the liquid outlet of the gas-liquid separator 5H, and was overcooled by the third subcooler 5J, and a portion of the liquid was throttled through the first throttle valve V4 to about 0.13 MPaA and entered the third subcooler 5J to be reheated. The reheated fluid entered the heat exchanger 5A to be further reheated and discharged as waste gas from the nitrogen liquid device system; the remaining liquid was extracted from the liquid nitrogen product channel 85 as a high-purity liquid nitrogen product, the gas in the gas-liquid separator 5H exited through the gas outlet 12 of the gas-liquid separator, entered the heat exchanger 5A to be reheated, and then entered the first compressor 5K1 and the second compressor 5K2 sequentially for compression to about 2.5 MPaA in the circulating compression system, the liquid from the bottom of the second distillation column 5E was overcooled in a second subcooler 5F and then evaporated on the evaporation side of the second condenser 5G, the evaporated gas was reheated successively through the second subcooler 5F and the first subcooler 5D, the reheated fluid entered the heat exchanger 5A for further reheating and was discharged as waste gas from the nitrogen liquid device system.

Figure 3:
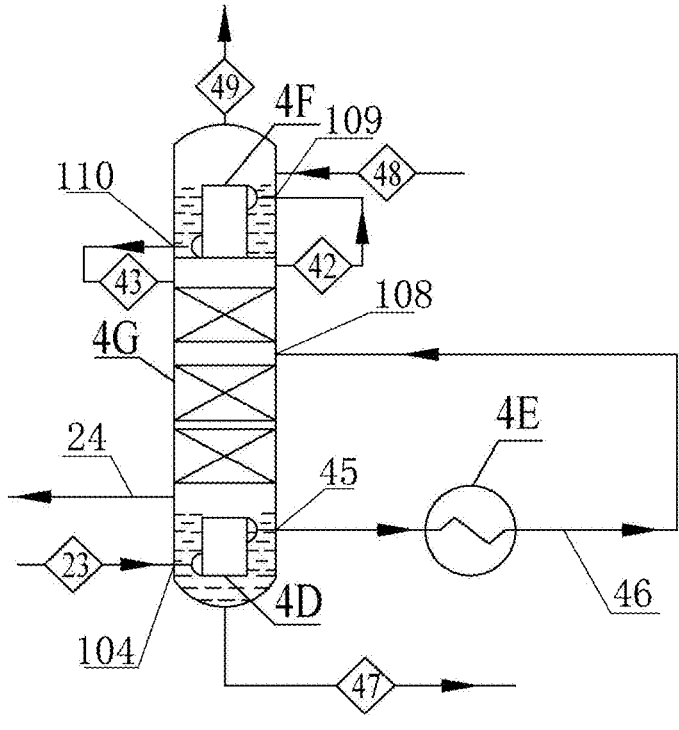
FIG. 3 is a structural schematic diagram of a $CO_2$ low-temperature purification system.

As shown in FIG. 3, the pressurized crude $CO_2$ gas (a temperature of about 25° C., a pressure of about 2.3 MPaA, molar components of about 92% $CO_2$, 8% $N_2$, 50 ppm $NO_2$, 10 ppm $SO_2$) entering the $CO_2$ low-temperature purification system was fed into the evaporator 4D to evaporate the liquid from the bottom of the distillation column 4G, and cooled to about −10° C., then entered the liquefier 4E to be cooled to −17° C. close to the saturation temperature, and entered the middle section of the distillation column 4G to undergo distillation, in the third condenser 4F, the gas from the top of the distillation column 4G was condensed and returned as the reflux liquid at the top of the distillation column 4G to undergo distillation, and entered the third condenser 4F through the condensation liquid inlet channel 48 to be heated and vaporized to provide cooling energy, the liquid $CO_2$ product was obtained at the bottom of the distillation column 4G, and the regeneration gas was extracted from the ninth pipeline 24 of the distillation column 4G.

The specific embodiments described herein are merely illustrative of the principles and effects of the present invention and are not intended to limit the present invention. Those skilled in the art may make modification or alteration to the above embodiments without departing from the spirit and scope of the present invention. Therefore, all equivalent modifications or alterations made by a person of ordinary skill in the art without departing from the spirit and technical ideas disclosed by the present invention shall fall within the scope of protection defined by the appended claims.

The invention claimed is:

1. A device for producing liquid from flue gas with low energy consumption, comprising a $CO_2$ and $N_2$ low-temperature medium-pressure adsorption system, an energy utilization system, a low-temperature filtration gas low-temperature compression system, a $CO_2$ low-temperature purification system (101), and a nitrogen liquid device system (100); the systems are interconnected through pipelines and valves, wherein the $CO_2$ and $N_2$ low-temperature medium-pressure adsorption system comprises a flue gas cooler (1A), a first gas-liquid separator (1B), a compression system (1C), a drying system (1D), a gas expander system, and a low-temperature medium-pressure adsorption device (1H), which is used to cool, pressurize, dewater, and perform low-temperature adsorption separation of $CO_2$ and $N_2$ from the flue gas; the energy utilization system comprises an electric heater (2E), a $CO_2$ compressor (2A), a heat utilizer (2B), and a second cooler (2C), which is used to pressurize, recover heat and cool desorbed gas obtained from the $CO_2$ and $N_2$ low-temperature medium-pressure adsorption system; the low-temperature filtration gas low-temperature compression system comprises a low-temperature compressor (3A), which is used for low-temperature pressurization of the low-temperature medium-pressure filtered gas obtained from the $CO_2$ and $N_2$ low-temperature medium-pressure adsorption system, the $CO_2$ low-temperature purification system (101) is used to further purify and liquefy the low-temperature medium-pressure gas obtained from the energy utilization system, to obtain a liquid $CO_2$ product; and the nitrogen liquid device system (100) is used to distill and liquefy medium-pressure gas discharged from the low-temperature compression system, to obtain a liquid nitrogen product;

one end of a flue gas cooler (1A) in the $CO_2$ and $N_2$ low-temperature medium-pressure adsorption system is connected to a flue gas discharge port, while the other end is connected to a first gas-liquid separator (1B), in the first gas-liquid separator (1B), the liquid is discharged through a water outlet (13) of the first gas-liquid separator, and the gas enters the compression system (1C) through a gas outlet (12) of the first gas-liquid separator for compression, cooling, and dewatering, the compressed, cooled, and dewatered flue gas enters the drying system (1D) through a first pipeline (14) to dehydrate and dry thoroughly, so that the flue gas emitted from the drying system (1D) has a water content of ppm level, the drying system (1D) is connected to a gas expander system, wherein the gas expander system consists of a first expander boosting end (1E), a first cooler (1F), and a gas expansion end (1G), the flue gas with ppm-level water content sequentially enters the first expander boosting end (1E), the first cooler (1F), and the gas expansion end (1G) through the second pipeline (15), the gas expansion end (1G) then enters the low-temperature medium-pressure adsorption device (1H) through a rear third pipeline (18), where the $CO_2$ in the low-temperature medium-pressure flue gas is adsorbed and captured using the low-temperature medium-pressure adsorption principle, a crude $CO_2$ gas with a carbon purity of 85-90% is obtained at a desorption gas outlet (19) of the low-temperature medium-pressure adsorption device, and a medium-pressure crude nitrogen gas with a $CO_2$ concentration of less than 1 ppm is obtained at the low-temperature medium-pressure filtered gas outlet (20) of the low-temperature medium-pressure adsorption device; the nitrogen purity of the medium-pressure crude nitrogen gas is 87-93%, thus achieving the purpose of carbon nitrogen separation, the low-temperature medium-pressure filtered gas outlet (20) is also connected to the low-temperature medium-pressure adsorption device (1H) through a fourth pipeline (32), so that a portion of the low-temperature filtered gas enters the low-temperature medium-pressure adsorption device (1H) through the fourth pipeline (32) as cold-blowing regeneration gas, to cold-blow the adsorbent in the low-temperature medium-pressure adsorption device (1H);

the desorption gas outlet (19) of the low-temperature medium-pressure adsorption device is connected to the $CO_2$ compressor (2A) in the energy utilization system, to compress and boost the crude $CO_2$ gas; the $CO_2$ compressor (2A) is sequentially connected to the heat utilizer (2B), the second cooler (2C), and the $CO_2$ low-temperature purification system (101), the second cooler (2C) further cools the cooled and pressurized crude $CO_2$ gas, such that the pressurized crude $CO_2$ gas exiting from the second cooler (2C) meets the temperature and pressure requirements of the $CO_2$ low-temperature purification system (101), the $CO_2$ low-temperature purification system (101) is used to purify and refine the pressurized low-temperature $CO_2$, yielding industrial-grade or food-grade $CO_2$, the $CO_2$ low-temperature purification system (101) is connected to the heat utilizer (2B) through a ninth pipeline (24), and the heat utilizer (2B) is connected to the fourth pipeline (32) of the low-temperature medium-pressure adsorption device (1H), to heat the low-temperature regeneration gas exiting from the $CO_2$ low-temperature purification system (101), which then enters the low-temperature medium-pressure adsorption device (1H) as heated regeneration gas;

the low-temperature medium-pressure filtered gas outlet (20) of the low-temperature medium-pressure adsorption device is sequentially connected to the low-temperature compressor (3A) and the nitrogen liquid device system (100) in the low-temperature filtered gas compression system at the rear, to pressurize all or most of the low-temperature filtered gas, which then enters the nitrogen liquid device system (100), the nitrogen liquid device system (100) is used to further refine and liquefy the pressurized low-temperature filtered gas to obtain the liquid nitrogen product, a tenth pipeline (26) is arranged at the rear of the nitrogen liquid device system (100), the tenth pipeline (26) is branched into two routes at the rear, one route is sequentially connected to the heat utilizer (2B) and the electric heater (2E), the electric heater (2E) is connected to a sixth pipeline (102), and the sixth pipeline (102) is connected to the drying system (1D), to heat the waste gas regeneration gas from the nitrogen liquid device system (100) to a required temperature before entering the drying system (1D) as the regeneration gas for heating, the other route of the tenth pipeline (26) is directly connected to the sixth pipeline (102), to feed the waste gas regeneration gas from the nitrogen liquid device system (100) to directly enter the drying system (1D) as cold blow gas for cold blowing;

the $CO_2$ low-temperature purification system (101) comprises a third condenser (4F), an evaporator (4D), a liquefier (4E), and a third distillation column (4G), wherein the third condenser (4F) is mounted above the third distillation column (4G), and the evaporator (4D) is mounted below the third distillation column (4G), the liquefier (4E) is arranged separately outside the column; the second cooler (2C) is connected to the evaporator (4D), and the evaporator (4D) is connected to the liquefier (4E), the liquefier (4E) is connected to the third distillation column (4G) through an eighth pipeline (46); the third distillation column (4G) is connected to the third condenser (4F), and the third condenser (4F) is connected to the third distillation column (4G) through a seventh pipeline (110) to form a closed loop, a condensation liquid inlet channel (48) and a condensation gas outlet channel (49) are formed in the third condenser (4F), a ninth pipeline (24) is provided below the third distillation column (4G) and is connected to the heat utilizer (2B), a fifth pipeline (47) is provided at the bottom of the third distillation column (4G) for obtaining the liquid $CO_2$ product;

the nitrogen liquid device system (100) comprises a circulating compression system, a high and low-temperature gas expander, a heat exchanger (5A), a second gas-liquid separator (5H), a distillation column system, and a subcooler, the circulating compression system consists of a first compressor (5K1) and a second compressor (5K2), the high and low-temperature gas expander is equipped with a second expander boosting end (5P), a first expansion end (5T), and a second expansion end (5U), the subcooler consists of a first subcooler (5D), a second subcooler (5F), and a third subcooler (5J), the distillation column system consists of a first distillation column (5B) and a second distillation column (5E), wherein a first condenser (5C) is mounted above the first distillation column (5B), and a second condenser (5G) is mounted above the second distillation column (5E), the low-temperature compressor (3A) is sequentially connected to the heat exchanger (5A) and the first distillation column (5B), the first distillation column (5B) is provided with two branch pipelines, wherein the first branch of the first distillation column (5B) is sequentially connected to the first subcooler (5D), the first condenser (5C), the second distillation column (5E), the second subcooler (5F), and the second condenser (5G), the second condenser (5G) is sequentially connected to the second subcooler (5F), the first subcooler (5D), and the heat exchanger (5A) through pipelines at the top; the heat exchanger (5A) is connected to the tenth pipeline (26) for the regeneration of the drying system (1D), the second branch pipeline of the first distillation column (5B) is directly connected to the first condenser (5C) and the heat exchanger (5A) separately; the first condenser (5C) is also provided with two branch pipelines, wherein the first branch pipeline of the first condenser (5C) is connected to the first distillation column (5B), and the second branch pipeline of the first condenser (5C) is connected to the second gas-liquid separator (5H); the second distillation column (5E) is provided with two branches, wherein the first branch of the second distillation column (5E) is connected to the second condenser (5G), and the second branch of the second distillation column (5E) is connected to the heat exchanger (5A); the second condenser (5G) is also provided with two branches, wherein the first branch of the second condenser (5G) is connected to the second distillation column (5E), and the second branch of the second condenser (5G) is sequentially connected to the second gas-liquid separator (5H) and the third subcooler (5J); one end of the third subcooler (5J) is connected to the liquid nitrogen product channel, and the other end is connected to the heat exchanger (5A) through a first throttle valve (V4) through the third subcooler (5J), the second gas-liquid separator (5H) is connected to the heat exchanger (5A), and the heat exchanger (5A) is sequentially connected to the first compressor (5K1) and the second compressor (5K2), the second compressor (5K2) is provided with two branches, wherein the first branch of the second compressor (5K2) is sequentially connected to the high and low-temperature gas expander (5P), the heat exchanger (5A), and the second expansion end (5U), and finally connected to the second gas-liquid separator (5H) for circulation through the second expansion end (5U), the second branch of the second compressor (5K2) is sequentially connected to the heat exchanger (5A), the first expansion end (5T), the heat exchanger (5A), and finally connected to the first compressor (5K1) for circulation through the heat exchanger (5A), the heat exchanger (5A) is directly connected to the second gas-liquid separator (5H), and a second throttle valve (V3) is provided on the connecting pipeline, using the low-temperature distillation principle, the low-temperature nitrogen-containing gas obtained from the low-temperature compressor (3A) is further purified and liquefied, so as to obtain the liquid nitrogen product.

2. A method for using a device for producing liquid from flue gas with low energy consumption, comprising the following steps:

Pre) providing the device for producing liquid from flue gas with low energy consumption, wherein the device comprises a $CO_2$ and $N_2$ low-temperature medium-pressure adsorption system, an energy utilization system, a low-temperature filtration gas low-temperature compression system, a $CO_2$ low-temperature purification system (101), and a nitrogen liquid device system (100); the systems are interconnected through pipelines and valves, wherein the $CO_2$ and $N_2$ low-temperature medium-pressure adsorption system comprises a flue gas cooler (1A), a first gas-liquid separator (1B), a compression system (1C), a drying system (1D), a gas expander system, and a low-temperature medium-pressure adsorption device (1H), which is used to cool, pressurize, dewater, and perform low-temperature adsorption separation of $CO_2$ and $N_2$ from the flue gas; the energy utilization system comprises an electric heater (2E), a $CO_2$ compressor (2A), a heat utilizer (2B), and a second cooler (2C), which is used to pressurize, recover heat and cool desorbed gas obtained from the $CO_2$ and $N_2$ low-temperature medium-pressure adsorption system; the low-temperature filtration gas low-temperature compression system comprises a low-temperature compressor (3A), which is used for low-temperature pressurization of the low-temperature medium-pressure filtered gas obtained from the $CO_2$ and $N_2$ low-temperature medium-pressure adsorption system, the $CO_2$ low-temperature purification system (101) is used to further purify and liquefy the low-temperature medium-pressure gas obtained from the energy utilization system, to obtain a liquid $CO_2$ product; and the nitrogen liquid device system (100) is used to distill and liquefy medium-pressure gas discharged from the low-temperature compression system, to obtain a liquid nitrogen product;

one end of a flue gas cooler (1A) in the $CO_2$ and $N_2$ low-temperature medium-pressure adsorption system is connected to a flue gas discharge port, while the other end is connected to a first gas-liquid separator (1B), in the first gas-liquid separator (1B), the liquid is discharged through a water outlet (13) of the first gas-liquid separator, and the gas enters the compression system (1C) through a gas outlet (12) of the first gas-liquid separator for compression, cooling, and dewatering, the compressed, cooled, and dewatered flue gas enters the drying system (1D) through a first pipeline (14) to dehydrate and dry thoroughly, so that the flue gas emitted from the drying system (1D) has a water content of ppm level, the drying system (1D) is connected to a expander system, wherein the gas expander system consists of a first expander boosting end (1E), a first cooler (1F), and a gas expansion end (1G), the flue gas with ppm-level water content sequentially enters the first expander boosting end (1E), the first cooler (1F), and the gas expansion end (1G) through the second pipeline (15), the gas expansion end (1G) then enters the low-temperature medium-pressure adsorption device (1H) through a rear third pipeline (18), where the $CO_2$ in the low-temperature medium-pressure flue gas is adsorbed and captured using the low-temperature medium-pressure adsorption principle, a crude $CO_2$ gas with a carbon purity of 85-90% is obtained at a desorption gas outlet (19) of the low-temperature medium-pressure adsorption device, and a medium-pressure crude nitrogen gas with a $CO_2$ concentration of less than 1 ppm is obtained at the low-temperature medium-pressure filtered gas outlet (20) of the low-temperature medium-pressure adsorption device; the nitrogen purity of the medium-pressure crude nitrogen gas is 87-93%, thus achieving the purpose of carbon nitrogen separation, the low-temperature medium-pressure filtered gas outlet (20) is also connected to the low-temperature medium-pressure adsorption device (1H) through a fourth pipeline (32), so that a portion of the low-temperature filtered gas enters the low-temperature medium-pressure adsorption device (1H) through the fourth pipeline (32) as cold-blowing regeneration gas, to cold-blow the adsorbent in the low-temperature medium-pressure adsorption device (1H);

the desorption gas outlet (19) of the low-temperature medium-pressure adsorption device is connected to the $CO_2$ compressor (2A) in the energy utilization system, to compress and boost the crude $CO_2$ gas; the $CO_2$ compressor (2A) is sequentially connected to the heat utilizer (2B), the second cooler (2C), and the $CO_2$ low-temperature purification system (101), the second cooler (2C) further cools the cooled and pressurized crude $CO_2$ gas, such that the pressurized crude $CO_2$ gas exiting from the second cooler (2C) meets the temperature and pressure requirements of the $CO_2$ low-temperature purification system (101), the $CO_2$ low-temperature purification system (101) is used to purify and refine the pressurized low-temperature $CO_2$, yielding industrial-grade or food-grade $CO_2$, the $CO_2$ low-temperature purification system (101) is connected to the heat utilizer (2B) through a ninth pipeline (24), and the heat utilizer (2B) is connected to the fourth pipeline (32) of the low-temperature medium-pressure adsorption device (1H), to heat the low-temperature regeneration gas exiting from the $CO_2$ low-temperature purification system (101), which then enters the low-temperature medium-pressure adsorption device (1H) as heated regeneration gas;

the low-temperature medium-pressure filtered gas outlet (20) of the low-temperature medium-pressure adsorption device is sequentially connected to the low-temperature compressor (3A) and the nitrogen liquid device system (100) in the low-temperature filtered gas compression system at the rear, to pressurize all or most of the low-temperature filtered gas, which then enters the nitrogen liquid device system (100), the nitrogen liquid device system (100) is used to further refine and liquefy the pressurized low-temperature filtered gas to obtain the liquid nitrogen product, a tenth pipeline (26) is arranged at the rear of the nitrogen liquid device system (100), the tenth pipeline (26) is branched into two routes at the rear, one route is sequentially connected to the heat utilizer (2B) and the electric heater (2E), the electric heater (2E) is connected to a sixth pipeline (102), and the sixth pipeline (102) is connected to the drying system (1D), to heat the waste gas regeneration gas from the nitrogen liquid device system (100) to a required temperature before entering the drying system (1D) as the regeneration gas for heating, the other route of the tenth pipeline (26) is directly connected to the sixth pipeline (102), to feed the waste gas regeneration gas from the nitrogen liquid device system (100) to directly enter the drying system (1D) as cold blow gas for cold blowing;

the $CO_2$ low-temperature purification system (101) comprises a third condenser (4F), an evaporator (4D), a liquefier (4E), and a third distillation column (4G), wherein the third condenser (4F) is mounted above the third distillation column (4G), and the evaporator (4D) is mounted below the third distillation column (4G), the liquefier (4E) is arranged separately outside the column; the second cooler (2C) is connected to the evaporator (4D), and the evaporator (4D) is connected to the liquefier (4E), the liquefier (4E) is connected to the third distillation column (4G) through an eighth pipeline (46); the third distillation column (4G) is connected to the third condenser (4F), and the third condenser (4F) is connected to the third distillation column (4G) through a seventh pipeline (110) to form a closed loop, a condensation liquid inlet channel (48) and a condensation gas outlet channel(49) are formed in the third condenser (4F), a ninth pipeline (24) is provided below the third distillation column (4G) and is connected to the heat utilizer (2B), a fifth pipeline (47) is provided at the bottom of the third distillation column (4G) for obtaining the liquid $CO_2$ product;

the nitrogen liquid device system (100) comprises a circulating compression system, a high and low-temperature gas expander, a heat exchanger (5A), a second gas-liquid separator (5H), a distillation column system, and a subcooler, the circulating compression system consists of a first compressor (5K1) and a second compressor (5K2), the high and low-temperature gas expander is equipped with a second expander boosting end (5P), a first expansion end (5T), and a second expansion end (5U), the subcooler consists of a first subcooler (5D), a second subcooler (5F), and a third subcooler (5J), the distillation column system consists of a first distillation column (5B) and a second distillation column (5E), wherein a first condenser (5C) is mounted above the first distillation column (5B), and a second condenser (5G) is mounted above the second distillation column (5E), the low-temperature compressor (3A) is sequentially connected to the heat exchanger (5A) and the first distillation column (5B), the first distillation column (5B) is provided with two branch pipelines, wherein the first branch of the first distillation column (5B) is sequentially connected to the first subcooler (5D), the first condenser (5C), the second distillation column (5E), the second subcooler (5F), and the second condenser (5G), the second condenser (5G) is sequentially connected to the second subcooler (5F), the first subcooler (5D), and the heat exchanger (5A) through pipelines at the top; the heat exchanger (5A) is connected to the tenth pipeline (26) for the regeneration of the drying system (1D), the second branch pipeline of the first distillation column (5B) is directly connected to the first condenser (5C) and the heat exchanger (5A) separately; the first condenser (5C) is also provided with two branch pipelines, wherein the first branch pipeline of the first condenser (5C) is connected to the first distillation column (5B), and the second branch pipeline of the first condenser (5C) is connected to the second gas-liquid separator (5H); the second distillation column (5E) is provided with two branches, wherein the first branch of the second distillation column (5E) is connected to the second condenser (5G), and the second branch of the second distillation column (5E) is connected to the heat exchanger (5A); the second condenser (5G) is also provided with two branches, wherein the first branch of the second condenser (5G) is connected to the second distillation column (5E), and the second branch of the second condenser (5G) is sequentially connected to the second gas-liquid separator (5H) and the third subcooler (5J); one end of the third subcooler (5J) is connected to the liquid nitrogen product channel, and the other end is connected to the heat exchanger (5A) through a first throttle valve (V4) through the third subcooler (5J), the second gas-liquid separator (5H) is connected to the heat exchanger (5A), and the heat exchanger (5A) is sequentially connected to the first compressor (5K1) and the second compressor (5K2), the second compressor (5K2) is provided with two branches, wherein the first branch of the second compressor (5K2) is sequentially connected to the high and low-temperature gas expander (5P), the heat exchanger (5A), and the second expansion end (5U), and finally connected to the second gas-liquid separator (5H) for circulation through the second expansion end (5U), the second branch of the second compressor (5K2) is sequentially connected to the heat exchanger (5A), the first expansion end (5T), the heat exchanger (5A), and finally connected to the first compressor (5K1) for circulation through the heat exchanger (5A), the heat exchanger (5A) is directly connected to the second gas-liquid separator (5H), and a second throttle valve (V3) is provided on the connecting pipeline, using the low-temperature distillation principle, the low-temperature nitrogen-containing gas obtained from the low-temperature compressor (3A) is further purified and liquefied, so as to obtain the liquid nitrogen product;

1) Flue gas pre-treatment:

Performing compression, cooling, dewatering, and drying treatment on the flue gas, wherein the water content of the treated flue gas is less than 1 ppm;

2) Coarse separation of $CO_2$ and $N_2$ gases:

Introducing the gas from the step 1) into the gas expander system to obtain crude carbon dioxide gas with a carbon purity of 85-90%, and medium-pressure crude nitrogen gas with a carbon dioxide concentration of less than 1 ppm, wherein the nitrogen purity of the medium-pressure crude nitrogen gas is 87-93%;

3) Purification and liquefaction to obtain the liquid $CO_2$ product

Introducing the crude $CO_2$ gas with a carbon purity of 85-90% obtained from the step 2) into the $CO_2$ low-temperature purification system (101) to obtain the liquid $CO_2$ product; and 4) Purification and liquefaction to obtain the liquid $N_2$ product:

Introducing the medium-pressure crude nitrogen gas with a carbon dioxide concentration of less than 1 ppm obtained from the step 2) into the nitrogen liquid device system (100) to obtain the liquid $N_2$ product.

3. The method for using the device for producing liquid from flue gas with low energy consumption according to claim 2, wherein the specific method for the step 1 comprises: feeding the flue gas emitted at normal temperature and pressure into a flue gas cooler inlet (10), cooling the flue gas with a cooling medium, passing the cooled flue gas through the first gas-liquid separator (1B) to remove condensed water from the flue gas, and discharging the water through the water outlet (13) of the first gas-liquid separator; the cooled flue gas subsequently flows through a gas outlet (12) of the first gas-liquid separator into the compression system (1C) for compression, cooling, and dewatering, the pressurized medium-pressure flue gas is then conveyed through the first pipeline (14) into the drying system (1D) for further dewatering and drying, such that the water content of the medium-pressure flue gas exiting from the drying system (1D) is less than 1 ppm.

4. The method for using the device for producing liquid from flue gas with low energy consumption according to claim 2, wherein the specific method for the step 2 comprises: pressurizing at the first expander boosting end (1E) of the gas expander system, cooling by the first cooler (1F), expanding and cooling at the gas expansion end (1G), feeding the expanded low-temperature medium-pressure gas into the low-temperature medium-pressure adsorption device (1H), adsorbing and capturing $CO_2$ in the low-temperature medium-pressure flue gas according to the principle of low-temperature medium-pressure adsorption, to obtain the crude $CO_2$ with a carbon purity of 85-90% from the desorbed gas outlet of the low-temperature medium-pressure adsorption device (1H), and obtain medium-pressure crude nitrogen with a $CO_2$ concentration of less than 1 ppm from the low-temperature medium-pressure filtered gas outlet (20) of the low-temperature medium-pressure adsorption device (1H); the nitrogen purity of the medium-pressure rough nitrogen gas is 87-93%, thereby achieving the separation of carbon and nitrogen, the low-temperature medium-pressure adsorption device (1H) switches between adsorption, desorption, regeneration, and cold blowing through valves and pipelines.

5. The method for using the device for producing liquid from flue gas with low energy consumption according to claim 2, wherein the specific steps for obtaining liquid $CO_2$ in the step 3 comprise: feeding the desorbed gas from the desorption gas outlet (19) of the low-temperature medium-pressure adsorption device into the $CO_2$ compressor (2A) in the energy utilization system, pressurizing the crude $CO_2$ gas, feeding the pressurized high-temperature high-pressure gas into the heat utilizer (2B) for heat exchange, adsorbing and utilizing the thermal energy of the pressurized coarse $CO_2$ gas, causing the gas to cool, then entering the second cooler (2C), and further cooling the crude $CO_2$ gas, such that the pressurized crude $CO_2$ gas exiting from the second cooler (2C) meets the temperature and pressure requirements for the raw materials entering the $CO_2$ low-temperature purification system (101), the raw material temperature is 20-30° C., and the pressure is 2.0-2.5 MPaA, the gas then enters the $CO_2$ low-temperature purification system (101), to purify and refine the pressurized low-temperature $CO_2$ to obtain industrial-grade or food-grade $CO_2$, the low-temperature regeneration gas is extracted from the ninth pipeline (24) of the $CO_2$ low-temperature purification system (101) and can be reheated using the heat utilizer (2B), the reheated regeneration gas then enters the low-temperature medium-pressure adsorption device (1H), to heat and regenerate an adsorbent requiring regeneration, which eliminates the need for external heat energy during the regeneration process of the low-temperature medium-pressure adsorption device (1H).

6. The method for using the device for producing liquid from flue gas with low energy consumption according to claim 2, wherein the specific steps for obtaining liquid $N_2$ in the step 4 comprise: compressing all or most of the medium-pressure crude $N_2$ gas with a carbon dioxide concentration of less than 1 ppm from the low-temperature medium-pressure adsorption device (1H) by the low-temperature compressor (3A) in the low-temperature filtration gas low-temperature compression system, and directly entering the nitrogen liquid device system (100), when the adsorbent in the low-temperature medium-pressure adsorption device (1H) requires cold blowing for regeneration, a portion of the low-temperature filtered gas as cold blow regeneration gas is fed into the low-temperature medium-pressure adsorption device (1H) through the fourth pipeline (32), to cold-blow the adsorbent in the low-temperature medium-pressure adsorption device (1H), the pressurized filtered gas then enters the nitrogen liquid device system (100) for distillation and liquefaction, the waste gas regeneration gas from the nitrogen liquid device system (100) is fed into the heat utilizer (2B) through the tenth pipeline (26) to be heated, then enters the electric heater (2E) to be further heated to the required temperature, and enters a second inlet of the drying system (1D) as heated regeneration gas, the waste gas regeneration gas from the nitrogen liquid device system (100) can also be directly fed into the second inlet of the drying system (1D) through the tenth pipeline (26) as cold blow gas.

7. The method for using the device for producing liquid from flue gas with low energy consumption according to claim 5, wherein the specific method for purifying $CO_2$ gas in the $CO_2$ low-temperature purification system (101) comprises: feeding the crude $CO_2$ gas entering the $CO_2$ low-temperature purification system (101) into the evaporator (4D) to evaporate the liquid from the bottom of the third distillation column (4G), cooling, then entering the liquefier (4E) to be cooled to the saturation temperature, and entering the middle section of the third distillation column (4G) to undergo distillation, in the third condenser (4F), the gas from the top of the third distillation column (4G) is condensed and returned as the reflux liquid at the top of the third distillation column (4G) to undergo distillation, and enters the third condenser (4F) through the condensation liquid inlet channel (48) to be heated and vaporized to provide cooling energy, the liquid $CO_2$ product is obtained at the bottom of the third distillation column (4G), and the liquid $CO_2$ product is output through the fifth pipeline (47) at the bottom of the third distillation column (4G), and is then extracted through the ninth pipeline (24) from the upper part of the third distillation column (4G) to enter the heat utilizer (2B) for heating.

8. The method for using the device for producing liquid from flue gas with low energy consumption according to claim 6, wherein the specific method for purifying the $N_2$ gas in the nitrogen liquid device system (100) comprises: over-cooling the gas entering the nitrogen liquid device system (100) to a saturated state in the heat exchanger (5A) and then entering the distillation column system, the distillation column system adopts a dual-column distillation process, a portion of the medium-pressure nitrogen gas from the top of the first distillation column (5B) is condensed in the first condenser (5C), with the condensed liquid nitrogen portion returning to the top of the first distillation column (5B), and a portion enters the second gas-liquid separator (5H), the liquid extracted from the bottom of the first distillation column (5B) is overcooled in a first subcooler (5D) and then enters the first condenser (5C) as a coolant, after heating, the liquid exits from the first condenser (5C) and enters the bottom of the second distillation column (5E) for further distillation, a portion of the low-pressure nitrogen gas exiting from the top of the second distillation column (5E) is condensed in the second condenser (5G), with the liquid nitrogen portion returning to the top of the second distillation column (5E), while a portion enters the second gas-liquid separator (5H), another portion of the medium-pressure nitrogen gas exiting from the top of the first distillation column (5B) is reheated in the heat exchanger (5A) and then enters the second compressor (5K2) in the circulating compression system for compression, another portion of the low-pressure nitrogen gas exiting from the top of the second distillation column (5E) is reheated in the heat exchanger (5A) and enters the first compressor (5K1) and the second compressor (5K2) sequentially in the circulating compression system for compression, the gas compressed by the second compressor (5K2) is directed into the second expander boosting end (5P) of the high and low-temperature gas expander for pressurization, and after pressurization, enters the heat exchanger (5A) for cooling, a portion of the gas is extracted from the middle of the heat exchanger (5A) and enters the second expansion end (5U) for expansion, the expanded fluid then enters the second gas-liquid separator (5H), the remaining gas is extracted from the bottom of the heat exchanger (5A), throttled through the second throttle valve (V3), and enters the second gas-liquid separator (5H); another portion of gas directly enters the heat exchanger (5A) and is extracted from the upper part of the heat exchanger (5A) into the first expansion end (5T) for expansion, the expanded gas enters the heat exchanger (5A) for reheating and then enters the first compressor (5K1) and the second compressor (5K2) sequentially for compression in the circulating compression system, after gas-liquid separation in the second gas-liquid separator (5H), the liquid flows out from the liquid outlet of the second gas-liquid separator (5H), and is overcooled by the third subcooler (5J), and a portion of the liquid is throttled through the first throttle valve (V4) and enter the third subcooler (5J) to be reheated, the reheated fluid enters the heat exchanger (5A) to be further reheated and discharged as waste gas from the nitrogen liquid device system (100); the remaining liquid is extracted from the liquid nitrogen product channel (85) as a high-purity liquid nitrogen product, the gas in the second gas-liquid separator (5H) exits through the gas outlet of the second gas-liquid separator (5H), enters the heat exchanger (5A) to be reheated, and then enters the first compressor (5K1) and the second compressor (5K2) sequentially for compression in the circulating compression system, the liquid from the bottom of the second distillation column (5E) is overcooled in a second subcooler (5F) and then evaporated on the evaporation side of the second condenser (5G), the evaporated gas is reheated successively through the second subcooler (5F) and the first subcooler (5D), the reheated fluid enters the heat exchanger (5A) for further reheating and is discharged as waste gas from the nitrogen liquid device system (100).

9. The method for using the device for producing liquid from flue gas with low energy consumption according to claim 6, wherein the adsorbent used in the low-temperature medium-pressure adsorption device (1H) is primarily a molecular sieve, silica gel, and activated carbon, and is configured with two units, which can be used individually or simultaneously, the drying system (1D) consists of two drying tanks connected in parallel, and the two drying tanks can be used individually or simultaneously.

\* \* \* \* \*